United States Patent Office 3,160,222
Patented Dec. 8, 1964

3,160,222
PROPELLER SHAFT MOUNTED RETARDER
Philip J. Mazziotti, Toledo, Ohio, assignor to Dana Corporation, Toledo, Ohio, a corporation of Virginia
Filed June 23, 1961, Ser. No. 119,239
8 Claims. (Cl. 180—70)

This invention relates to brakes in general and more specifically to a brake mounted in a drive line system.

Brakes normally consist of a non-rotating or reaction member and an action or rotating member which is desired to be coupled to the reaction member during braking. Of necessity, the reaction member must be fixed against rotation.

In the case of a brake of the type interposed in the drive line of a vehicle, the rotating or action member is normally mounted on a rotating portion of the drive line which in turn is rotatably mounted on the non-rotating reaction member. Prior art brakes of this nature normally have the non-rotating member fixedly attached to some portion of the vehicle, normally the frame, and mounted in the drive line of the vehicle between the transmission and the axle. Since this portion of the drive line must accommodate relative movement between the transmission and the axle, it must be adapted for vertical movement. However, in most prior art devices, since the drive line is rotatably mounted within the brake reaction member, the fixed attachment of the brake reaction member interferes with the free movement of the drive line.

This necessitates the provision of a universal coupling means, including a shaft, between the brake and the axle and between the brake and the transmission. In many vehicle arrangements, especially those having a short wheel base, there is insufficient space for such an arrangement of a plurality of shafts and the brake, and in addition such an arrangement, because of the multiplicity of parts, is relatively expensive.

It is therefore an object of this invention to provide means for mounting a drive line brake against rotation which means does not interfere with the free movement of the drive line.

It is another object of this invention to provide a drive line brake which allows the use of short drive line coupling distances.

It is yet another object of this invention to provide a brake mounting which permits the brake and the drive line to move relative to the vehicle.

It is a further object of this invention to provide a drive line brake mounting which fixes the brake against rotation but does not fixedly attach the brake or the drive line to the vehicle.

It is a still further object of this invention to provide a drive line brake which is integral and movable with the drive line.

It is a still further object of this invention to provide such a brake which results in the use of a minimum of parts, is simple to manufacture and assemble, yet durable and inexpensive.

These and further objects will be evident from the following detailed description taken in conjunction with the following drawings wherein:

FIG. 5 being taken along lines 5—5 in FIG. 4.

In a preferred embodiment of this invention, the brake, in the form of a hydraulic retarder having reaction means attached to the case thereof, is provided with a first shaft in the form of an internally splined sleeve yoke, which shaft drives the rotating action means or impeller member of the retarder. The yoke end of the first shaft extends externally of the retarder case while the sleeve portion thereof is rotatably mounted within the case. A second yoke shaft, externally splined, is slidingly received in the sleeve yoke shaft of the retarder forming a through shaft therewith, and its yoke portion extends from the end of the retarder opposite the first yoke. The length of these yokes is such that one is coupled directly by universal means to the output of the transmission or any other suitable source of rotative power, while the other is coupled directly by universal means to the balance of the vehicle drive line, usually the axle input shaft. In this manner, no separate coupling shafts or universal connections are required to join the brake to the axle or to the transmission. In addition, changes in length requirements of the drive line are accommodated by the sliding connection between the two yoke shafts.

A vertical pivotal mounting is provided between the retarder case and the transmission. More particularly, the mounting takes the form of a pair of yoke-like brackets, one attached to the rear of the transmission and the other attached to the forward end of the retarder. These brackets are positioned whereby the lugs thereof are aligned in parallel relationship and interconnected by trunnion means. The trunnion means, preferably an integral portion of one of the brackets, is disposed in openings in the other bracket with a resilient bushing interposed therebetween. It is apparent that although the retarder case, containing the reaction member, is fixed against rotation, it is movably mounted relative to the vehicle with the drive shafts. Other types of brakes are contemplated by this invention, however for simplicity only a hydraulic retarder will be described. Also, this invention may be modified to provide universal pivotal movement of the brake.

Figure 1:
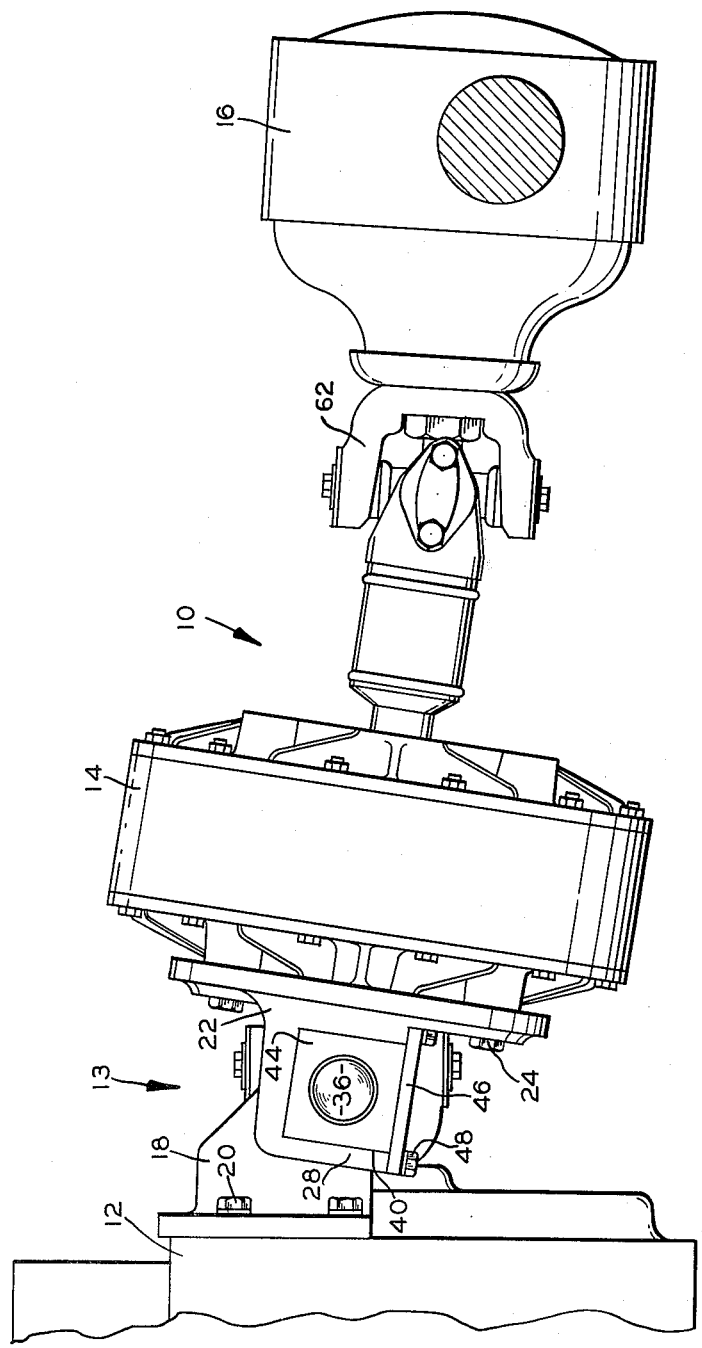
FIG. 1 is a side elevational view of a vehicle drive line embodying this invention.

Referring now to the drawings and more particularly to FIG. 1 wherein a vehicle drive line is shown generally at 10, a suitable source of rotative power in the form of a transmission is shown fragmentarily at 12, a retarder or brake at 14, and a rear axle is shown fragmentarily at 16. The transmission 12, which is driven by a suitable source of power (not shown), has a retarder 14 attached thereto for vertical movement by a mounting arrangement 13. The mounting arrangement includes a bracket 18 fixedly attached to the transmission as by a plurality of bolts 20. The brake 14 in the form of a hydraulic retarder has a second bracket 22 fixedly attached thereto by a plurality of bolts 24.

Figure 2:
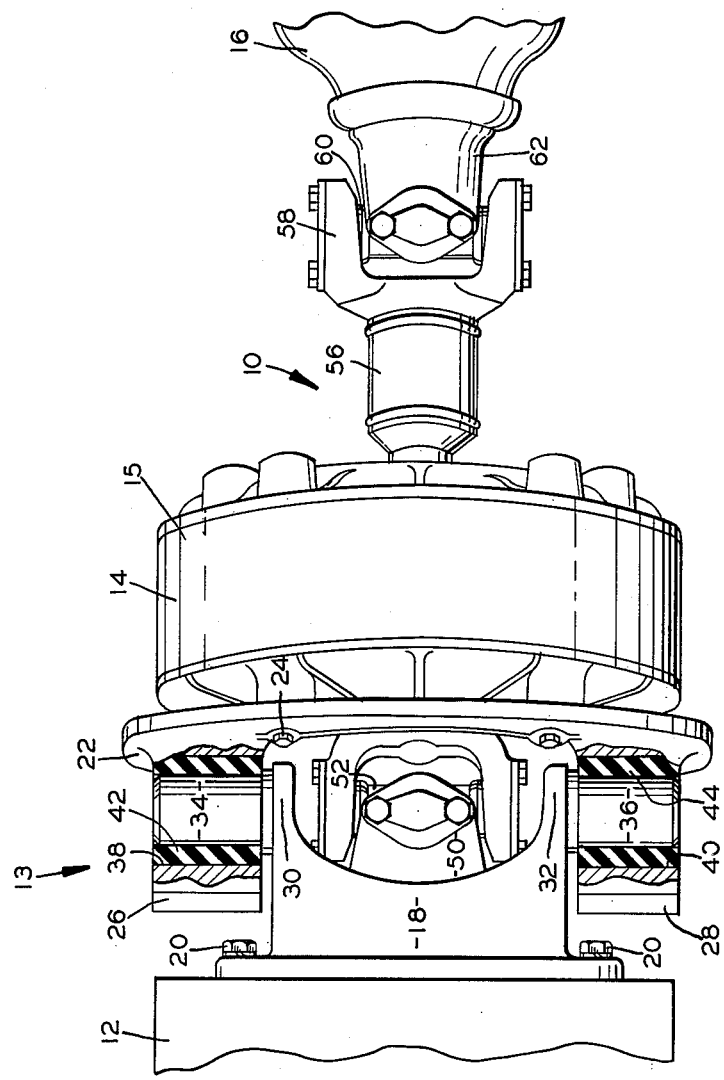
FIG. 2 is a plan view, partly in section, of the vehicle drive line shown in FIG. 1.

Referring now to FIG. 2 wherein the details of the mounting brackets 18 and 22 are more clearly evident, it is apparent that the brackets have a yoke-like shape. More specifically, the bracket 22 on the retarder 14 has a pair of aligned, parallel lugs 26 and 28 extending axially therefrom toward the transmission 12. The bracket 18, which is fixedly attached to the transmission 12, also has a pair of aligned, parallel lugs 30 and 32 extending axially herefrom, toward the retarder 14. The lugs 30 and 32 are aligned and parallel to the lugs 26 and 28 of the bracket 22 and interposed therebetween.

Each lug 30 and 32 has an integral trunnion 34 and 36 respectively, which trunnions extend radially into aligned openings 38 and 40 respectively in the lugs 26 and 28. Interposed between the trunnion 34 and the lug 26 is a resilient bushing 42, and interposed between the trunnion 36 and the lug 28 is a resilient bushing 44. As evident in FIG. 1, the bushing 44 has a square configuration and is received in a cooperating square opening 40 of the lug 28. Upon positioning the bushing 44 within the opening 40, the cover plate 46 is fixedly attached to the lug 28 by a plurality of bolts 48. The bushing 44 and the opening 40 are such that when the plate 46 is attached thereto, the bushing 44 is fixedly positioned relative to the lug 28. The trunnion 34, bushing 42, and the lug 26 are connected in a similar manner. As clearly shown in FIG. 2, the centers of the trunnions 34 and 36 and the openings 38 and 40 are aligned and coplanar with the center of the universal coupling 52 so that the retarder 14 and drive line 10 pivot arcuately about the same point relative to the transmission 12.

It is apparent from the foregoing description that the bracket 22 is pivotally mounted in a resilient manner relative to the bracket 18. Thus, the retarder 14 may pivot vertically relative to the transmission 12 while rotation between the two is limited, thereby accommodating relative movement between the transmission 12 and axle 16.

Figure 4:
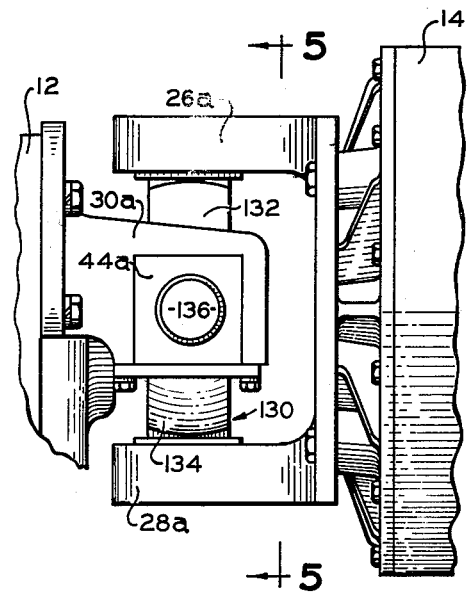
FIGS. 4 and 5 are views of another embodiment of this invention with the drive line omitted for added clarity.
Figure 5:
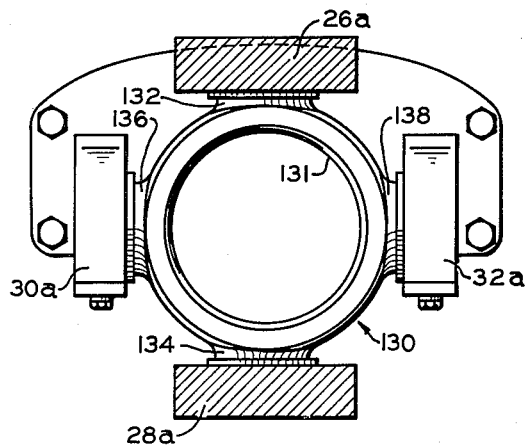

In FIG. 4, the retarder 14 is provided with a pair of vertically spaced and opposed lugs 26a and 28a and the transmission 12 is provided with a pair of horizontally spaced and opposed lugs 30a and 32a, with the horizontal and vertical lugs being disposed in alternating circumferentially spaced cooperating relationship. A journal cross 130 having a pair of vertically extending opposed trunnions 132 and 134 and pair of horizontally extending opposed trunnions 136 and 138 disposed at 90° respectively relative to the trunnions 132 and 134, is adapted to connect the lugs 26a and 28a to the lugs 30a and 32a for universal pivotal movement. The trunnions 132, 134, 136 and 138 are pivotally mounted in the lugs 26a, 28a, 30a and 32a respectively, so that the brake 14 and transmission 12 may pivot universally relative to each other while being held against relative rotation. The journal cross 130 has a central aperture 131 through which the drive line (omitted for clarity) extends.

Figure 3:
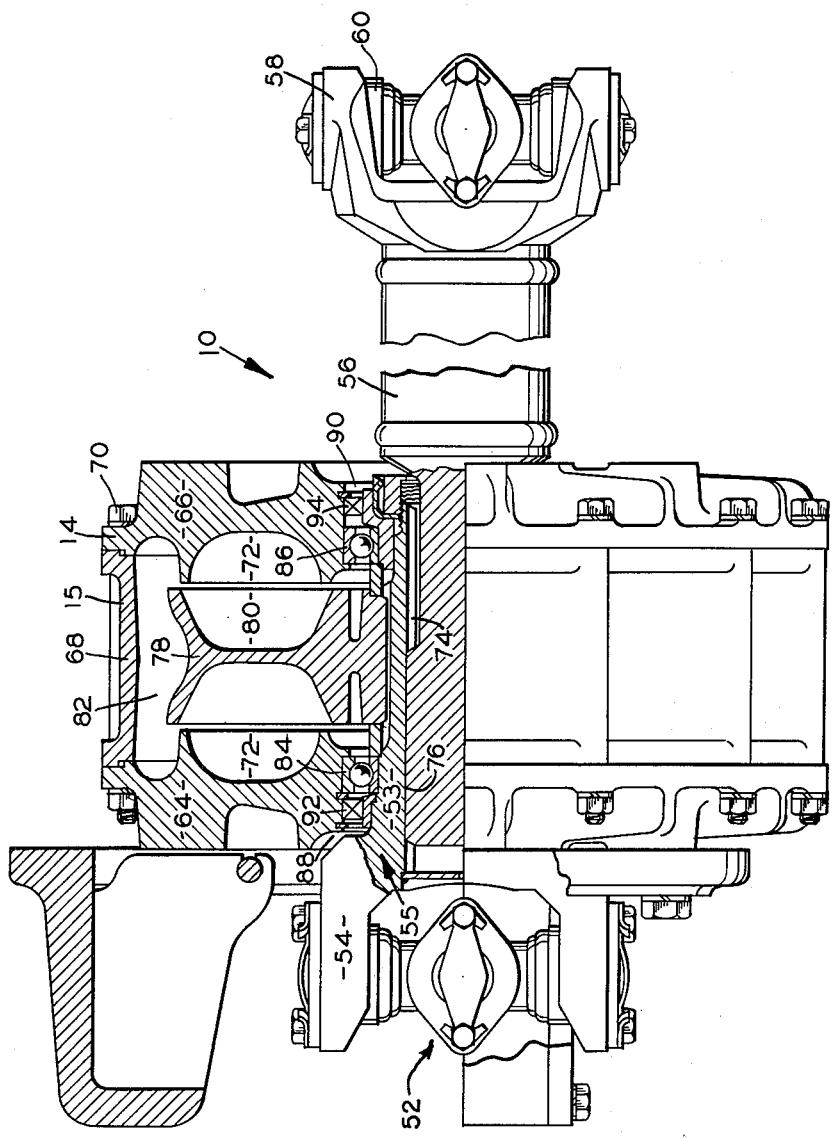
FIG. 3 is a side elevational view, partly in section, showing the details of the means by which the brake is mounted on the drive line.

As in the embodiment of FIGS. 1–3, the lugs 30a and 32a are provided with resilient inserts 44a into which the trunnions 136 and 138 are received so that the trunnions are resiliently mounted in these lugs and rotation between the journal cross 130 and the lugs 30a and 32a is resiliently limited and the pivotal center of the lugs 26a, 28a, 30a and 32a is arranged to coincide with the center of the universal joint in the drive line (omitted for clarity) disposed in the center of the journal cross 130.

The transmission 12, which is the source of rotative power for the drive line 10, is provided with a yoke 50 on its output shaft (not shown) which yoke is connected by a universal coupling shown generally at 52 to a yoke 54 on the input shaft of the retarder 14. The output shaft 56 of the retarder 14 is provided with a yoke 58 which is connected by a second universal coupling shown generally at 60 to a yoke 62 on the input shaft of the rear axle 16. The brackets 18 and 22 are spaced so that the yokes 50 and 54 may freely rotate therebetween and so that the drive line 10 may move with a universal pivotal movement relative to the transmission 12 which drives the same without interference, even when the retarder 14 moves relative to the transmission 12.

Referring now to FIG. 3 the retarder shown generally at 14 has a three piece case 15 comprising cover faces 64 and 66 and a central annular portion 68. The cover faces 64 and 66 are fixedly attached to the central portion 68 by means of a plurality of bolts 70. Integral with the cover faces 64 and 66 are the reaction blades 72 of the retarder 14. It is apparent that since the retarder 14 is held against rotation the reaction blades 72 are also fixed against rotation.

The input shaft 55 of the retarder 14 is in the form of a sleeve yoke having a shaft portion 53 and a yoke portion 54. The shaft portion 53 is provided with a central axially extending, splined opening 74. Slidingly received in the central opening 74 of the input shaft 55 is the output shaft 56 which has an externally splined portion 76 slidably received in the splined opening. The shafts 55 and 56 thereby form a substantially rigid through shaft for the retarder 14. Output shaft 56 terminates in a yoke 58 which is adapted to receive the universal coupling 60. This sliding engagement of the shafts 55 and 56 is adapted to accommodate changes in displacement between the axle 16 and the transmission 12.

Mounted on the input shaft 55 for rotation therewith is the impeller or action member 78 which has a plurality of blades 80 integral therewith adapted to cooperate with the reaction blades 72. By charging the chamber 82, defined by the case 15, with a hydraulic fluid, the impeller blades 80 will be hydrokinetically coupled to the reaction blades 72 thereby retarding the motion of the impeller 78 and the shaft 55 connected thereto. When the chamber 82 is emptied of hydraulic fluid the impeller 78 is not coupled to the reaction members 72 and does not retard or brake the shaft 55 and the drive line 10 in which the shaft 55 is disposed.

The shaft 55 is rotatably mounted in the cover faces 64 and 66 of the retarder 14 by bearings 84 and 86 respectively, which are received in openings 88 and 90 provided in the cover faces 64 and 66. A sealing means 92 and 94 are interposed between the shaft 55 and the openings 88 and 90 respectively to prevent the leakage of hydraulic fluid contained within the retarder 14.

It is apparent that the drive line 10 is comprised of shafts 55 and 56 which are rotatably mounted in the retarder 14. As explained above, the action or impeller member 78 rotates with the drive line. The retarder case 14, having fixedly attached thereto the reaction means 72, is fixed against rotation relative to the vehicle by means of its attachment to the transmission 12, yet free to move in a vertical plane relative thereto by means of the mounting arrangement shown generally at 13 whereby the axle 16 and the drive line 10 may move relative to the transmission 12 without being interferred with by the brake or retarder 14.

From the foregoing it is apparent that a drive line brake has been described which is mounted against rotation but which does not interfere with the free movement of the drive line; which is integral and movable with the drive line; which allows the use of short drive line coupling distances, and is free to move relative to the vehicle; which is not fixedly attached to the vehicle and therefore can move relative thereto, and which is simple to manufacture and assembly yet durable and inexpensive.

The preferred embodiment of this invention has been shown and described, but changes and modifications can be made, and it is understood that this description is illustrative only and not for the purpose of rendering this invention limited to the details illustrated and described except insofar as they have been limited by the terms of the following claims.

What is claimed is:

1. A drive line brake comprising in combination a source of rotative power having a housing, brake means having a housing and being disposed in spaced relationship relative to said source of rotative power, power shaft means having an axis of rotation and being drivingly connected to said source of power and being universally movable relative thereto, said power shaft means being rotatably mounted in said brake means and adapted to be retarded thereby, lug means securely disposed on each of said housings and positioned in cooperating relationship, and radially extending connecting means pivotally connecting said lug means and limiting rotation of the housing of said brake means about the axis of said power shaft means whereby said brake means pivots with said power shaft means relative to said source of rotative power.

2. A drive line brake comprising in combination a source of rotative power having a housing, a brake means having a housing disposed in spaced relationship relative to said source of rotative power, a drive line rotatably mounted in said brake means housing and adapted to be retarded by said brake means, universally pivotal means drivingly connecting said drive line and said source of power, a pair of lugs rigidly attached to each of said housings with the lugs on one of said housings being in cooperating relationship with a lug on said other housing, and substantially radially extending connecting means pivotally connecting said lugs while limiting relative rotation therebetween and limiting rotation of the housing of said brake means about said drive line axis of rotation, said pair of lugs on each housing being positioned in spaced apart relationship and said universally pivotal means being disposed therebetween whereby said brake means pivots freely relative to said source of rotative power with said drive line.

3. A drive line brake comprising in combination, a transmission having a housing, a brake means having a housing disposed in spaced relationship relative to said transmission, a drive line rotatably mounted in said brake means housing and adapted to be retarded thereby, universally pivotal means having a center point and drivingly connecting said drive line and said transmission, at least two lugs rigidly attached to each of said housings with the lugs on one of said housings each in paired relationship with a respective lug on said other housing, one lug of each of said paired lugs having an opening therein and a substantially radially extending trunnion on the other paired lug pivotally disposed in the opening of said one lug, said lugs on each housing being positioned in spaced apart relationship and said universally pivotal means being disposed within the space between said lugs and the center of said universal pivotal means being substantially aligned with the pivotal axis of said trunnion whereby said brake means pivots freely relative to said transmission with said drive line while relative rotative movement between the transmission and brake means is limited.

4. A device for braking a drive line comprising in combination, a housing adapted to be fixed against rotation, reaction means disposed in said housing and connected thereto, action means in said housing positioned in cooperating relationship with said reaction means, and through shaft means rotatably disposed in said housing and drivingly connected to said action means, said through shaft means comprising a first shaft with a portion thereof extending entirely through said housing and having a splined axial opening extending for substantially the entire portion thereof which is within said housing, and a second shaft having an externally splined portion telescopically received by said opening in driving relationship, whereby said through shaft means is adapted to transmit power, be acted upon by said reaction means and accommodate axial movement in said drive line and a compact extensible arrangement is provided which is disposed within said brake housing.

5. A power transmitting mechanism for a vehicle comprising a transmission having a housing and adapted to receive power from an engine, an axle adapted to drive the wheels of the vehicle, a drive line adapted to be connected to said transmission and said axle, universal joint means connecting said transmission to said drive line and said axle to said drive line, said drive line including a first shaft havng an internally splined sleeve portion and a second shaft having an externally splined portion slidably received in said sleeve portion, a brake housing disposed between said transmission and said axle, said sleeve portion of said first shaft being rotatably mounted in said brake housing, reaction means fixedly carried by said brake housing, action means carried by said first shaft for rotation therewith and disposed in cooperating relationship with said reaction means whereby upon coupling of said reaction means and said action means said brake acts on the drive line, lug means disposed on said transmission housing and said brake housing in cooperating relationship for pivotally mounting said brake housing relative to said transmission while limiting relative rotation therebetween, said lug means being positioned in spaced apart relationship and said universal joint means connecting the transmission and the drive line being disposed therebetween and aligned therewith whereby said brake pivots freely with said drive line relative to said transmission and said axle.

6. A power transmitting mechanism for a vehicle comprising in combination, a transmission including a housing, an axle movably disposed in spaced relationship relative to said transmission, brake means having a longitudinal axis and including a housing movably disposed in spaced relationship relative to said transmission and axle and positioned therebetween, lug means on each of said housings disposed in cooperating relationship, radially extending connecting means pivotally connecting said lug means while limiting relative rotation therebetween and limiting rotation of the housing of said brake means about said longitudinal axis, a substantially rigid drive line drivingly connected at its ends to said transmission and said axle, each of said connections comprising a single universal joint, said drive line having means therein for accommodating relative displacement between said transmission and said axle, and said drive line being rotatably mounted in said brake housing whereby said brake means and said drive line pivot unitarily relative to said transmission and axle.

7. A power transmitting mechanism for a vehicle comprising in combination, a transmission including a housing, an axle movably disposed in spaced relationship relative to the transmission, brake means including a housing movably disposed in spaced relationship relative to said transmission and axle and positioned therebetween, a substantially rigid drive line connected at its ends to said transmission and said axle in driving relationship, each of said connections comprising a single universal joint having a center, said drive line having means accommodating relative displacement between said transmission and said axle and being rotatably mounted in said brake housing, a plurality of lug means on each of said housings disposed in cooperating relationship, means pivotally connecting said cooperating lug means while limiting relative rotation therebetween, said last named means being aligned and coplanar with the center point of said universal joint connecting said drive line and said transmission whereby said brake means and said drive line pivot unitarily relative to said transmission and axle.

8. A drive line brake comprising in combination, a source of rotative power having a housing, a drive line including through shaft means for transmitting rotative power, universally pivotal means drivingly connecting said through shaft means and said source of power, said through shaft means including a first shaft having an internally splined sleeve portion and a second shaft having an externally splined portion slidably received in said sleeve portion, a brake housing rotatably mounting the sleeve portion of said first shaft, reaction means disposed in said brake housing and connecting thereto, action means mounted on said first shaft for rotation therewith and disposed in cooperating relationship with said reaction means whereby upon coupling of said reaction and action means said brake acts on said drive line, a pair of aligned lugs on each of said housings with each of the lugs on one of said housing in cooperating relationship with a lug on said other housings, one lug of each of said cooperating lugs having an opening therein, and trunnion means on the other of said lugs being pivotally disposed in said opening of the cooperating lug thereby pivotally connecting said housings while preventing relative rotation therebetween, said pair of lugs on each housing being positioned in spaced apart relationship, and said universally pivotal means being disposed within the space between said lugs whereby said drive line and said brake housing may pivot unitarily relative to said source of power while said drive line transmits rotative power.

References Cited in the file of this patent

UNITED STATES PATENTS

| | | |
|---|---|---|
| 1,629,746 | Sprung | May 24, 1927 |
| 1,691,970 | Haggart | Nov. 20, 1928 |
| 1,865,525 | La Brie | July 5, 1932 |
| 1,984,413 | Lee | Dec. 18, 1934 |
| 2,672,954 | Bennett | Mar. 23, 1954 |
| 2,790,518 | Wilson | Apr. 30, 1957 |
| 2,860,734 | Ashton | Nov. 18, 1958 |
| 2,963,118 | Booth et al. | Dec. 6, 1960 |